United States Patent [19]
Rasshofer et al.

[11] Patent Number: 5,283,364
[45] Date of Patent: Feb. 1, 1994

[54] HYDROLYSIS PROCESS FOR POLYAMINES

[75] Inventors: Werner Rasshofer, Cologne; Klaus König, Odenthal; Hans-Joachim Meiners; Gerhard Grögler, both of Leverkusen, all of Fed. Rep. of Germany

[73] Assignee: Bayer Aktiengesellschaft, Leverkusen, Fed. Rep. of Germany

[21] Appl. No.: 4,808

[22] Filed: Jan. 15, 1993

Related U.S. Application Data

[63] Continuation of Ser. No. 479,810, Feb. 14, 1990, abandoned, which is a continuation of Ser. No. 233,302, Aug. 17, 1988, abandoned, which is a continuation of Ser. No. 916,923, Oct. 9, 1986, abandoned.

[30] Foreign Application Priority Data

Oct. 18, 1985 [DE] Fed. Rep. of Germany ....... 3537116
Apr. 19, 1986 [DE] Fed. Rep. of Germany ....... 3613249

[51] Int. Cl.$^5$ ............................................. C07C 85/00
[52] U.S. Cl. .................................... 564/393; 564/61; 564/414; 564/468; 564/489; 564/511; 528/53; 528/57
[58] Field of Search ................ 564/91, 393, 414, 468, 564/489, 511

[56] References Cited

U.S. PATENT DOCUMENTS 2,888,439  5/1959  Simons .
3,044,989  7/1962  Shivers .
3,385,829  5/1968  Heydkamp et al. .

(List continued on next page.)

FOREIGN PATENT DOCUMENTS 219035   4/1987  European Pat. Off. .
2948419  8/1981  Fed. Rep. of Germany .
3613249  4/1987  Fed. Rep. of Germany .
0007829  1/1980  Japan .
0920474  3/1963  United Kingdom .
1033912  6/1966  United Kingdom .
1117494  6/1968  United Kingdom .

OTHER PUBLICATIONS

J. March, "Advanced Organic Chemistry: Reactions, Mechanisms, and Structure" p. 658, McGraw Hill Book Co. 1968, N.Y.
"Organic Synthesis", Collective vol. 4, p. 819, John Wiley & Sons, Inc. 1963, N.Y.
E. Mohr J. Prakt., Chem. vol. 71, p. 133, 1905.
Helv. Chim. Acta, vol. 21, pp. 1100 et seq., C. Naegeli et al (1938).
J. Prakt. Chemie, vol. 130, 1931, pp. 314 et seq., H. John.
J. Prakt. Chemie, vol. 130, 1931, pp. 332, et seq. H. John.
Condensed Chemical Dictionary, Nineth Edition (Vua Nostrand Reinhold Company, 1977), p. 444.
The Organic Chemistry of Nitrogen, N. V. Sidgwick, Clarendon Press, Oxford, p. 236, 1966.

Primary Examiner—Donald G. Daus
Attorney, Agent, or Firm—Joseph C. Gil; Richard E. Henderson

[57] ABSTRACT

Polyamines containing primary amino groups are made by hydrolyzing an isocyanate with water in the presence of a solvent which is a carboxylic acid amide. The solvent must be used in a quantity of at least 10% by weight solvent based on 100% by weight of isocyanate. The weight ratio of solvent to water must be from 3 to 200. A homogeneous phase is maintained during the hydrolysis which is carried out at temperatures of from 20° to 210° C. A not incorporable basic and/or metal catalyst particularly alkali metal hydroxides may be employed. The polyamines produced by this process are particularly useful for the production of polyurethanes.

11 Claims, No Drawings

U.S. PATENT DOCUMENTS

| | | | |
|---|---|---|---|
| 3,525,871 | 8/1970 | Lehtinen . | |
| 3,808,250 | 4/1974 | Blahak et al. . | |
| 3,931,116 | 1/1976 | Bernstein et al. . | |
| 4,129,741 | 12/1978 | Schmidt et al. | 560/50 |
| 4,153,801 | 5/1979 | Schmidt et al. | 548/312 |
| 4,169,206 | 9/1979 | Mazanek et al. | 560/50 |
| 4,180,644 | 12/1979 | Marquis et al. | 528/68 |
| 4,224,417 | 9/1980 | Hajek et al. | 521/166 |
| 4,247,677 | 1/1981 | Schmidt et al. | 528/68 |
| 4,260,557 | 4/1981 | Mazanek et al. . | |
| 4,328,322 | 5/1982 | Baron | 521/163 |
| 4,386,218 | 5/1983 | Rasshofer et al. | 564/38 |
| 4,504,648 | 3/1985 | Otani et al. | 528/76 |
| 4,515,923 | 5/1985 | Fauss et al. | 525/127 |
| 4,525,534 | 6/1985 | Rasshofer et al. . | |
| 4,540,720 | 9/1985 | Rasshofer et al. | 521/159 |
| 4,565,645 | 1/1986 | Rasshofer et al. . | |
| 4,835,224 | 5/1989 | Ruckes et al. | 564/511 |
| 4,843,107 | 6/1989 | Ruckes et al. | 564/305 |
| 4,843,108 | 6/1989 | Ruckes et al. | 564/305 |
| 4,931,595 | 6/1990 | Rasshofer et al. | 564/393 |
| 4,970,342 | 11/1990 | Fauss et al. | 564/393 |

HYDROLYSIS PROCESS FOR POLYAMINES

This application is a continuation of application Ser. No. 07/479,810 filed Feb. 14, 1990 (now abandoned) which is a cont. of Ser. No. 07/233,302 filed Aug. 17, 1988, (now abandoned) which is a cont. of Ser. No. 06/916,923 filed Oct. 9, 1986 (now abandoned).

BACKGROUND OF THE INVENTION

This invention relates to a simplified one-step process for the preparation of polyamines containing primary amino groups.

It is known that aromatic isocyanates can be converted into primary aromatic amines by acid hydrolysis. However, the amine resulting from this hydrolysis reacts with as yet unreacted isocyanate to form the corresponding urea thereby decreasing the amount of product amine. This secondary reaction cannot be suppressed even by using an excess of strong mineral acids. A recent example of this procedure is described in JP-P 55 007 829.

It is also known that isocyanates can be converted into amines by an acid or alkaline catalyzed reaction, as disclosed, for example, in N. V. Sidgwick, The Organic Chemistry of Nitrogen, Clarendon Press, Oxford, page 236 (1966) and in J. March, Advanced Organic Chemistry; Reactions, Mechanisms and Structure, McGraw-Hill Book Co., New York, page 658 (1968). Sidgwick indicates that isocyanate groups can be hydrolyzed under alkaline conditions but no details of such a process are disclosed. J. March also speaks in general terms of the fact that the hydrolysis of isocyanates and isothiocyanates to amines can be catalyzed with acids and bases. The occurrence of isocyanates as intermediate products is also known to those skilled in the art. For example, isocyanates are obtained in the course of the Curtius or Lossen degradation of acid azides and hydroxamic acids and are decomposed with aqueous acids to form amine salts. A procedure of this kind has been described, for example, in Organic Synthesis, Coll. Vol. IV, 819 (1963) in which the preparation of putrescine, hydrochloride is used as an example.

E. Mohr, J. prakt. Chem., 71 133 (1905) was one of the first to observe that phenyl isocyanate is more rapidly attached by dilute sodium hydroxide solution than by water at low temperatures. C. Naegeli et al., Helv. Chim. Acta, 21, 1100 (1938) report that when phenyl isocyanates substituted with electron acceptors (such as nitro groups, halogen atoms or acyl groups) are hydrolyzed in moist ether or in acetone containing 1% of water in the absence of acids or bases, the corresponding monoamines are obtained in the course of a reaction lasting from several minutes to up to one hour. From 2,4-dinitrophenyl isocyanate the amine can even be obtained in hot water without solvent in a virtually 100% yield and without side reactions leading to urea formation.

In a process for preparation of specified primary aromatic amines containing polyalkylene glycol ether segments described in DE-B 1,270,046, products obtained by the reaction of aromatic di- or triisocyanates with polyalkylene glycol ethers and/or polyalkylene glycol thioethers (preferably those with molecular weights of from 400 to 4000) are reacted with secondary or tertiary carbinols and then subjected (optionally in the presence of acid catalysts) to thermal decomposition at high temperatures in an inert solvent. One disadvantage of this process, apart from the high decomposition temperature, is that combustible, readily volatile alkenes which are explosive when mixed with air are formed in the course of thermal decomposition so that appropriate safety measures are required.

DE-B 1,694,152 (believed to correspond to U.S. Pat. No. 3,525,871) relates to the preparations of prepolymers containing at least two amino end groups by the reaction of hydrazine, aminophenylethylamine or other diamines with an isocyanate prepolymer obtained from a polyether polyol and polyisocyanate (NCO/NH ratio=1:1.5 to 1:5). Any unreacted amine must be carefully removed in a subsequent step of the process because the amine is a powerful catalyst in the reaction with polyisocyanates and shortens processing times, and may even act as a reaction component. A similar process is described in U.S. Pat. No. 3,931,116.

Another method for synthesizing polyamines containing urethane groups is described in FR-P 1,415,317 (believed to correspond to U.S. Pat. No. 3,385,829). In this process, isocyanate prepolymers containing urethane groups are reacted with formic acid to yield N-formyl derivatives which are saponified to aromatic amines having amino end groups. The reaction of isocyanate prepolymers with sulphamic acid according to DE-P 1,115,907 also leads to compounds containing amino end groups. Relatively high molecular weight prepolymers containing aliphatic secondary and primary amino groups may be obtained according to De-B 1,215,373 by the reaction of relatively high molecular weight hydroxyl compounds with ammonia in the presence of catalysts under pressure at elevated temperatures. According to U.S. Pat. No. 3,044,989 high molecular weight amines may be obtained by the reaction of relatively high molecular weight polyhydroxyl compounds with acylonitrile followed by catalytic hydrogenation. Relatively high molecular weight compounds containing amino end groups and urethane end groups may also be obtained according to DE-A 2,546,536 (believed to correspond to U.S. Pat. No. 4,224,417) and U.S. Pat. No. 3,865,791 by the reaction of isocyanate prepolymers with enamines, aldimines or ketimines containing hydroxyl groups, followed by hydrolysis. Another method for the synthesis of aromatic polyamines containing urethane and ether groups is opening of the ring which occurs in the reaction of isatoic acid anhydride with diols. Polyamines of this kind have been described, for example, in U.S. Pat. No. 4,180,644 and DE-A 2,019,432, (believed to correspond to U.S. Pat. No. 3,808,250) 2,619,840, (believed to correspond to U.S. Pat. Nos. 4,169,206 and 4,260,557), 2,648,774 (believed to correspond to U.S. Pat. Nos. 4,129,741 and 4,247,677), and 2,648,825 (believed to correspond to U.S. Pat. No. 4,153,801). Aromatic ester amines obtained by such methods have the disadvantage of being insufficiently reactive for many purposes.

Low reactivity is also found in compounds containing amino and ester groups obtained according to U.S. Pat. No. 4,504,648 by the reaction of polyether polyols with p-aminobenzoic acid ethyl ester and according to EP 32,547 (believed to correspond to U.S. Pat. No. 4,328,322) by the reaction of polyols with nitrobenzoic acid chloride followed by reaction of the nitro groups to amino groups.

The reaction of nitroaryl isocyanates with polyols followed by reduction of the nitro group to aromatic amine groups is also known (U.S. Pat. No. 2,888,439).

The main disadvantage of this process is the high cost of the reduction stage of the process.

It is also known that certain heteroaromatic isocyanic acid esters can be converted into heteroaromatic amines by basic hydrolysis. The conditions for hydrolysis disclosed by H. John in J. Prakt, Chemie 130, 314 et seq and 3323 et seq (1931) for two quite specific heteroaromatic monoisocyanic acid esters are, however, both completely unsuitable for the conversion of polyisocyanate compounds into aliphatic and/or aromatic amines and dangerous.

Applicants' own processes disclosed in DE-A 2,948,419 and 3,039,600 (believed to correspond to U.S. Pat. No. 4,386,218) are multistage processes for the preparation of polyamines by alkaline hydrolysis of isocyanate prepolymers using an excess of base (alkali metal hydroxides) at low temperatures to form carbamates, acidification with equivalent or excess quantities of mineral acids or acid ion exchanger resins accompanied by carbamate decomposition, and optionally neutralization of excess quantities of acid by means of bases, followed by isolation of the polyamines.

DE-OS 3,131,252 (believed to correspond to U.S. Pat. No. 4,540,720) discloses a process in which the carbamates obtained in a first stage by hydrolysis with alkali metal hydroxides are decomposed by subsequent heat treatment to yield the polyamines.

One-step processes for the production of polyamines are described in DE-OS 3,223,400 (EP-97,299), (believed to correspond to U.S. Pat. No. 4,970,342) DE-OS 3,233,398 (EP-97,298; believed to correspond to U.S. Pat. No. 4,565,645) and DE-OS 3,233,397 (EP-97,290) (believed to correspond to U.S. Pat. No. 4,515,923). In these one-step hydrolysis processes various solvent-catalyst combinations are employed. "Ether solvents" are used together with tertiary amines as catalysts in DE-OS 3,223,400 (believed to correspond to U.S. Pat. No. 4,970,342). Polar solvents such as dimethylformamide are used together with tertiary amines or relatively large quantities of alkali metal hydroxides, alkali metal silicates or alkali metal cyanides as catalysts in specified amounts in DE-OS 3,233,398 (believed to correspond to U.S. Pat. No. 4,515,923). Carbonates or carboxylates are used in specified amounts in polar solvents such as DMF in DE-OS 3,233,397 (believed to correspond to U.S. Pat. No. 4,565,645.

All of these processes for the preparation of polyamines are elaborate and expensive. Even in the last mentioned, more simplified methods for the conversion of polyisocyanates to polyamines, further simplification would be desirable for obtaining polyamines even more economically with even better conversion rates of $NCO/NH_2$ (i.e. higher $NH_2$ numbers) by an even smoother reaction. A satisfactory process should have the following advantages compared with conventional processes:

(1) no filtration required;
(2) no separation of a tertiary amine catalyst by distillation required;
(3) drastic reduction in the quantity of catalyst (both tertiary amines (according to DE-OS 3,223,398) and the inorganic, alkaline compounds such as KOH) required so that the catalyst could be left in the polyamine; and
(4) quantitative conversion of NCO into $NH_2$ groups (high $NCO/NH$ conversion rates, i.e. high amine numbers close to the theoretical value);
(5) no removal of by-products required; and
(6) simple working up of polyamines and auxiliary substances.

SUMMARY OF THE INVENTION

It has now been found, completely unexpectedly, that each of the above-listed advantages is obtained by the one-stage hydrolysis of polyisocyanates to polyamines of the present invention.

This hydrolysis is carried out with a particular ratio of water to NCO and a particular ratio by weight of solvent to water using water-soluble carboxylic acid amides as solvents and optionally, very small quantities of catalyst (no catalyst is less preferred) under conditions such that a homogeneous solution is maintained.

Such optimized conditions make it possible to use lower temperatures for hydrolysis.

In the process of the present invention, water-soluble solvents based on carboxylic acid amides, preferably carboxylic acid dialkylamides or lactams, are employed in order that a substantially homogeneous solution of the reactants (i.e. isocyanate compounds and water) and catalyst may be obtained. A particularly suitable solvent is dimethylformamide and in some cases also dimethylacetamide.

DETAILED DESCRIPTION OF THE INVENTION

It is known from DE-AS 1,235,499 that solutions of isocyanate prepolymers in dimethylformamide may be converted into highly viscous solutions suitable for spinning elasthane fibers or for coatings by reacting them with approximately equivalent quantities of water (80 to 120% of the theoretical amount, where 100% corresponds to ½ of water per NCO, i.e. the water reacts with two hydroxyl equivalents). This reaction is accompanied by chain lengthening via urea groups. The quite different reaction of isocyanate compounds with excess quantitites of water to form low molecular weight amines in high yields was unexpected. It was particularly surprising that this reaction could be carried out in the presence of the catalysts according to the invention which also accelerate the reaction of isocyanates with the reaction products formed.

It is also known that isocyanates react with dialkylformamides to form formamidines (H. Ulrich et al. J. Org. Chem., 33, 3928–3930 (1968) and the literature quoted therein). This reaction does not interfere with the smooth hydrolysis to polyamines by the process of the present invention.

One considerable advantage of the process of the present invention is the very low quantities of catalyst used. Consequently, there is no need to filter off catalyst or reaction products of the catalyst with the $CO_2$ liberated in the reaction (e.g. KOH giving rise to $KHCO_3$ and $K_2CO_3$).

since the catalysts useful in the present invention are readily soluble in the reaction medium, the problems which occur when using rapidly sedimenting alkali metal carbonates or bicarbonates (as in the case of DE-OS 3,223,297) (believed to correspond to U.S. Pat. No. 4,565,645) do not arise in the practice of the present invention. Since the catalysts remain in solution or are fully miscible, they need not be filtered off. The catalysts remaining in the amine product do not normally cause any difficulties due to the small quantities in which they are preferably used. Since no salts or residues of catalyst need be removed after the product has been worked up, the process of the present invention is particularly suitable for the preparation of highly viscous or solid compounds containing amino groups from which it is very difficult to remove undissolved residues of salt or catalyst material.

The catalysts of the present invention are also particularly suitable for the hydrolysis of isocyanate prepolymers based on polyesters because under the mild reaction conditions employed during the hydrolysis reaction the ester groups are not split off to any significant extent.

Compared to alkaline hydrolysis processes for obtaining aminopolyesters from an isocyanate, the process of the present invention is a significant improvement.

The catalysts of the present invention are inexpensive and commercially readily available. They may also be separated from the product and used again or, in the preferred embodiment, they may be left in the product. If it is necessary to produce a product which is completely free from catalyst, the process may even be carried out without a not incorporable alkaline and/or metal catalyst if the isocyanate, water and solvent are used in quantities such that the ratios required in the present invention (especially if the optimum proportion of solvent to water, the optimum ratio of water to NCO and comparatively high temperatures are used) are satisfied. The optimum ratios can be determined by a preliminary experiment. Comparatively high temperatures are used, preferably in the range of from about 80° to 100° C. Although the conversion rates obtained from such a catalyst-free process are only about 2/3 the rate obtained with catalyst, they are still very high (advantageous) compared with those obtained by the catalyst-free method according to DE-OS 3,223,398 (believed to correspond to U.S. Pat. No. 4,515,923). It is always preferably in the practice of the present invention to work in the presence of catalysts even if only extremely small quantities of catalysts.

The present invention relates to a single stage process for the preparation of polyamines containing primary amino groups by the hydrolysis of compounds containing isocyanate groups (preferably aromatic isocyanate groups) in media containing water, optionally with the addition of not incorporable alkaline and/or metal catalysts. More specifically, the isocyanate groups of organic compounds containing isocyanate groups, preferably aromatically bound isocyanate groups, based on isocyanate prepolymers or modified polyisocyanates having an isocyanate content of from 0.5 to 40 wt. % preferably 1.2 to 25 wt %, in the case of isocyanate prepolymers and 5 to 20.5 wt. %, preferably 1.5 to 10 wt. % in the case of modified polyisocyanates, are hydrolyzed with 0.75 to 50 mol of water, preferably 1 to 35, more preferably 1.25 to 12 and most preferably 1.5 to 7.5 mol of water per equivalent of isocyanate. This hydrolysis is carried out in the presence of 0 to 1% by weight, preferably 0.00005 to 1% by weight of not incorporable alkaline and/or metal catalysts, based on 100% by weight of isocyanate, preferably 0.0001 to 0.099% by weight of an alkaline catalyst. At least 10% by weight of carboxylic acid amides, preferably carboxylic acid dialkylamides or lactams, most preferably dimethylformamide or dimethylacetamide, based on 100% by weight of isocyanate are used as solvent in the hydrolysis mixture. Optionally, 0.1 to 5% by weight based on 100% by weight of isocyanate compound, of a compound containing one or more than one hydroxyl and/or amino and/or thiol group attached to an aliphatic, cycloaliphatic or aromatic group may be included. The solvent/water ratio by weight must be in the range of 3 to 200, preferably 5 to 150 more preferably 10 to 100 and most preferably $\geq 25$ to 75. The hydrolysis mixture is maintained in a homogeneous reaction phase. The hydrolysis is carried out at a temperature of 20° to 210° C., preferably 35° to 165° C., more preferably 40° to 150° C. and most preferably 80° to 130° C.

A preferred embodiment of the invention is a process having the above features in which the isocyanate is hydrolyzed in the presence of 0.0001 to 0.099, preferably 0.002 to 0.80% by weight, based on 100% by weight of isocyanate of alkali metal hydroxides, alkaline earth metal hydroxides, tetraalkylammonium hydroxides, alkali metal aluminates, alkali metal phenolates, alkali metal thiophenolates, alkali metal mercaptides, alkali metal hydrogen sulphides, soluble alkali metal and alkaline earth metal salts if (iso)(thio)cyanic acids and alkali metal $\beta$-diketone enolates; and/or 0.0001 to 0.099, preferably 0.002 to 0.08% by weight, based on 100% by weight of isocyanate of carbonates or bicarbonates of alkali metals; and/or 0.0001 to 0.099, preferably 0.0001 to 0.0099, more preferably 0.0002 to 0.008% by weight of alkali metal and alkaline earth metal salts of organic carboxylic acids including salts of formic acid as the alkaline catalyst. In an even more preferred embodiment the isocyanate is hydrolyzed with 1.25 to 12, preferably 1.5 to 7.5 mol of water per isocyanate equivalent using one of the above-listed not incorporable alkaline catalysts in the specified quantities while maintaining a carboxylic acid amide (preferably dimethylformamide/water) ratio by weight in the range of $\geq 10$ to 150, preferably $\geq 25$ to 75 at temperatures of 35° to 165° C., preferably 80° to 130° C.

In another embodiment of the process of the present invention the isocyanate is hydrolyzed in the presence of 0.0001 to 0.99% by weight, preferably 0.001 to 0.099% by weight of tertiary amino compounds (based on 100% by weight of isocyanate compound) using a water/NCO ratio of from 1 to 7.5 mol of water per NCO equivalent and a dialkyl carboxylic acid amide (preferably dimethylformamide/water) ratio by weight in the range of $\geq 10$ to 150, preferably $\geq 25$ to 75, at a temperature of 35° to 165° C. It is particularly preferred that this process be carried out in the presence of 0.0001 to 0.99% by weight of tertiary amine compounds using a water/NCO ratio of 1 to 24 mol of water per NCO equivalent and a dialkyl carboxylic acid amide/water (preferably dimethylformamide/water) ratio by weight of $\geq 10$ to 50 at a temperature of 35° to 165° C.

In another, less preferred embodiment of the invention, the isocyanate is hydrolyzed in the presence of 0.0001 to 0.0099, preferably 0.002 to 0.008% by weight of metal catalysts with preferably 1.5 to 7.5 mol of water per isocyanate equivalent while maintaining a carboxylic acid dialkylamide/water (preferably dimethylformamide/water) ratio by weight of $\geq 10$ to 50, preferably $\geq 25$ to 50, at temperatures of 25° to 165° C.

In the process of the present invention, the isocyanate may be hydrolyzed without a catalyst using a water/isocyanate ratio of 1 to 25 mol of water per isocyanate equivalent and a carboxylic acid dialkylamide/water (preferably dimethylformamide/water) ratio by weight of $\geq 10$ to 50, preferably $\geq 25$ to 50, at temperatures of 35° to 165° C., optionally under pressure.

The catalysts used in the inventive process have to be not incorporable, which mean that they do not have any groups which can react with NCO groups.

In the various embodiments of the present invention, the isocyanate compound is preferably an isocyanate prepolymer having an isocyanate content of from 1.5 to 10 wt. %. or a modified polyisocyanate, in particular a urethane-modified polyisocyanate having an isocyanate content of from 1.5 to 20.5 wt. %, in particular 5 to 20.5 wt. %. Neutral salts may be included in the hydrolysis mixture. It is preferred to use 1 to 35 mols of water, in particular 1.25 to 12 mols of water per equivalent of isocyanate.

The solvent is preferably dimethylformamide used in quantities of 100 to 1000% by weight, based on 100% by weight of isocyanate compound.

Hydrolysis is preferably carried out at temperatures from 40° to 150° C., most preferably at 80° to 130° C. and preferably without excess pressure. The solids concentration of the reaction mixture subjected to hydrolysis is generally from 20 to 75 wt. %, preferably 25 to 60 wt. %, most preferably 30 to 55 wt. %. Although even lower solids concentrations may be employed, this is less advantageous for practical reasons (e.g. solvent recovery).

The isocyanate hydrolyzed is preferably an isocyanate prepolymer containing from 0.5 to 40 wt. %, preferably 1.2 to 25 wt. %, more preferably from 1.5 to 10 wt. % of aromatically bound isocyanate groups and based on relatively high molecular weight, difunctional or higher functional polyether, polyester, polycaprolactone and/or polycarbonate polyols and diisocyanates or polyisocyanates modified with low molecular weight diols or polyols (molecular weight up to 399) and containing 1.5 to 20.5 wt. %, preferably 5 to 20.5 wt. % of NCO.

The invention also relates to the polyamines obtained by the process according to the invention, particularly those containing 0.46 to 9.52 wt. % of primary, preferably aromatically bound $NH_2$ groups.

The present invention further relates to the use of the polyamines obtained by the process of the present invention for the preparation of optionally cellular polyurethane(urea)s by reaction with a polyisocyanate and optionally other compounds containing isocyanate reactive groups, optionally in the presence of known auxiliary agents and additives and/or solvents.

According to the invention, a compound containing 1, 2 or more hydroxyl and/or amino and/or thiol groups bound to aliphatic, cycloaliphatic or aromatic groups may be added in minor quantities (i.e. 0.1 to 5% for every 100% of isocyanates). The addition of these compounds containing "H-active groups" is advantageous because polyamines virtually free from monomeric polyamines may be obtained from isocyanate compounds containing low molecular weight polyisocyanates (e.g. isocyanate semiprepolymers) without treatment of the isocyanate compounds by thin layer evaporation or similar processes. Modified polyamines which contain various segments linked through urethane groups, thiourethane groups or urea groups can thus be obtained quite simply and without an additional reaction step.

A trifunctional or higher functional polyamine can therefore be obtained from a difunctional isocyanate compound by using a trifunctional or higher functional compound containing "H active groups" in the isocyanate hydrolysis process.

The isocyanate compounds used in the process of the present invention contain two or more aromatic, heterocyclic and/or aliphatic (preferably aromatic) isocyanate groups. These isocyanates include modified polyisocyanates of the type obtained by partial conversion of isocyanate groups into urethane, urea, biuret, uretdione, isocyanurate and/or uretoneimine groups and isocyanate prepolymers obtained by the reaction of polyvalent compounds in the molecular weight range of 62 to 12,000 (preferably 400 to 6,000) containing isocyanate reactive H groups with (excess) quantities or aromatic polyisocyanates and (less preferred) semiprepolymers made up of isocyanate prepolymers and additional low molecular weight polyisocyanates.

Examples of modified aromatic polyisocyanates useful in the present invention include: polyisocyanates containing urethane groups (obtained by modification with low molecular weight polyols)l polyisocyanates containing urea groups (e.g. by modification with water, DE-P 1,230,778); polyisocyanates containing biuret groups (U.S. Pat. No. 3,124,605 and 3,201,372, GB-P 889,050); polyisocyanates containing isocyanurate groups (DE-PS 1,022,789 and 1,222,067) and dimeric and oligomeric polyisocyanates containing uretdione or uretoneimine groups. These are known compounds or are obtainable by known processes. Several such uretdione polyisocyanates are mentioned in Analytical Chemistry of the Polyurethanes, Volume 16/III, High-Polymers-Series (Wiley 1969).

Such modified polyisocyanates containing urethane and/or urea and/or biuret and/or uretdione and/or isocyanurate and/or uretoneimine groups suitable for the process of the present invention generally have an isocyanate content of from 1.5 to 40 wt. %, preferably from 10 to 25 wt. %. Polyisocyanates containing urethane groups (by modification with low molecular weight (molecular weight 62 to 399) diols and/or polyols) and having isocyanate contents of from >1.5 to 20.5 wt. %, preferably 5 to 20.5 wt. % are particularly preferred.

The most important isocyanate compounds useful in the process according to the invention are isocyanate prepolymers of the kind obtained in a known manner by the reaction of low molecular weight and/or relatively high molecular weight compounds containing hydroxyl and/or amino and/or thiol groups as reactive groups (molecular weight 62 to about 12,000) with an excess of polyisocyanate.

The polyisocyanates used for the preparation of the compounds containing free isocyanate groups may in principle be any aromatic, aliphatic or heterocyclic di- or polyisocyanates of the kind described, for example, by W. Siefken in Justus Liebigs Annalen der Chemie, 562, pages 75–136 (1949) and those known in the art which are mentioned on pages 12 to 23 of DE-OS 3,223,397. Low molecular weight and/or relatively high molecular weight compounds having molecular weights of 32 and 60–12,000 containing hydroxyl and/or amino and/or thiol groups as reactive groups suitable for the preparation of prepolymers and modified isocyanates are also described in these disclosures.

Isocyanate prepolymers which have been obtained from relatively high molecular weight polyols (molecular weight of 400 to 12,000), preferably polyether polyols, optionally together with chain lengthening agents of the type described above (molecular weight 62 to 399) by a reaction with aromatic diisocyanates in an equivalent ratio of 1:1.5 to 1:2.8 (in particular about 1:1.5 to 1:2) are preferred for the process according to the invention.

The isocyanate content of the isocyanate prepolymers used in the process amounts to 0.5 to 30 wt. %, preferably 1.2 to 25 wt. %, in particular 1.5 to 10 wt. % with functionalities of 2 to 8, preferably 2 to 4 and most preferably 2 to 3.

So-called "semiprepolymers", i.e. mixtures of isocyanate prepolymers or modified polyisocyanates with other free polyisocyanates which may have an even higher isocyanate content, e.g. up to 40 wt. %, may also be used in the process of the present invention. For practical and economic reasons, however, the use of these semiprepolymers is in most cases not advisable. The monomeric amine contents formed from the monomeric polyisocyanate components are liable to interfere with numerous applications.

In the form of their modified isocyanates (in most cases free from urethane groups) or in the form of their "semiprepolymers" or isocyanate prepolymers (containing urethane groups), the compounds containing free isocyanate groups have a total isocyanate group content within the range of 0.5 to 40 wt. %, preferably 1.2 to 25 wt. % and most preferably 1.5 to 10 wt. %.

Water is used as a reaction component, preferably in liquid form, In order to achieve substantial conversion of the isocyanate groups into $NH_2$ groups, it is necessary to use at least one mol of water per equivalent of NCO.

If substantially less than 1 mol (in particular <0.75 mol) of water is used, then prelengthening with urea formation preferentially takes place. On the other hand, it has surprisingly been found that the use of a very large excess of water also leads to relatively high proportions of unwanted prelenghtened products. This also occurs if the reaction mixture is monophasic. It has been found that the optimum quantity of water depends not only on the quantity of isocyanate groups to be converted but also on the quantity of solvent used.

This means that the quantity of water used for one equivalent of isocyanate is $\geq 0.75$ mol of water, preferably $\geq 0.75$ to 50 mol of water, more preferably 1 to 35 mol of water, most preferably 1.25 to 12 mol of water. If, for example, a bifunctional isocyanate prepolymer with T 100 (=2,4-tolylene diisocyanate) having an isocyanate content of 3.6% is used, then the equivalent weight of isocyanate groups is about 1167. This means that $\geq 13.5$ g of water, preferably 13.5-900 g, more preferably 18-630 g, and most preferably 22.5-216 g of water are used for about 1167 g of this prepolymer. The lower limit of water in this process is 0.75 mol of water, in most cases 1 mol of water and can be combined with the upper limits in any manner desired.

According to the invention, however, the water/-NCO ratio claimed must be used in conjunction with certain proportions by weight of solvent to water. These proportions by weight range from 3:1 to 200:1 but are preferably in the region of 5:1 to 150:1, especially from $\geq 10:1$ to 100:1, the optimum range being in most cases from $\geq 25:1$ to 75:1.

This means that, for example based on 1000 g of solvent (preferably dimethylformamide), the quantity of water used is in the range of 5 to 333 g.

It has been found that if the other conditions according to the invention are also observed, in particular if a relatively high proportion of solvent is used in the solvent/water mixture (in particular a dimethylformamide/water mixture), a particularly advantageous $NCO/NH_2$ conversion rate is obtained and that the quantities of catalyst used may be minimal.

If the absolute quantity of water required is used and the more advantageous solvent/water ratio is observed, the quantity of solvent is such that more than 10% by weight, preferably $\geq 100\%$ and most preferably us to 1000% of solvents are used for 100% by weight isocyanate component. It has been found that the minimum quantity of solvent required for achieving complete $NCO/NH_2$ conversions depends upon the reaction temperature. The higher the reaction temperature, the lower may be the quantity of solvent used. The quantity of water required (based on NCO) is largely unaffected by these factors.

If necessary, experiments may be carried out to determine the optimum ratios of NCO equivalents, water and solvent for a particular isocyanate component within the general framework indicated.

Alkaline and/or metal catalysts having no NCO reactive groups may be used in the present invention. These compounds are capable of raising the NH number of the amines in the product to a level above that obtainable without the use of catalysts.

The catalysts used may be solid or liquid but must be sufficiently soluble, preferably completely soluble in the reaction mixture. Based on 100% by weight of isocyanate component, the catalyst is generally used in a quantity of 0.00005-1% by weight. Different types of catalyst have different preferred ranges of quantities. The quantity of catalyst required is also dependent on the solvent/water ratio. The catalyst requirement is least when the optimum solvent/water ratio is employed, but even then a certain surprisingly small amount of catalyst, is required for producing the highest possible $NCO/NH_2$ conversion rates. Even if the water/solvent ratio is not quite optimal, good results can still be obtained by increasing the quantity of catalyst. The quantity of catalyst required for complete conversion of NCO groups into $NH_2$ groups also depends upon the reaction temperature. It is found that this quantity should be higher at lower temperatures, e.g. 45° C., than at a higher reaction temperature, e.g. at 100° C. If the amine yield is incomplete when a given quantity of catalyst is used, the yield may be increased by increasing the reaction temperature.

Basic inorganic and organic salts and in particular hydroxides (particularly preferred group) may be used as catalysts. These include salts of strong organic or inorganic bases with weak inorganic or organic acids which give an alkaline reaction in water. Specific examples of such catalysts include: hydroxides of alkali metals and alkaline earth metals and tetraalkylammonium hydroxides (in particular NaOH and KOH) and soluble aluminates (such as sodium aluminate); carbonates of alkali metals, in particular sodium carbonate and potash; bicarbonates of alkali metals, in particular sodium and potassium bicarbonate; alkali metal and alkaline earth metals salts of mono and polycarboxylic acids free from isocyanate reactive groups, including the salts of formic acid (preferably salts of monocarboxylic acids containing up to 18 carbon atoms) such as sodium formate, sodium acetate, potassium octoate and potassium stearate; alkali metal salts of phenols and thiophenols optionally substituted with groups which are unreactive with NCO; soluble alkali metal and alkaline earth metal salts of weak acids such as cyanic acid, isocyanic acid, thiocyanic acid, isothiocyanic acid, silicic acid, phorphorus-III- to -V-acids, hydrocyanic acid, hydrazoic acid, etc.; alkali metal mercaptides and sulphides and hydrogen(poly)sulphides; and $\beta$-diketone compounds such as sodium, potassium or magnesium acetylacetonates and acetonacetates. Tertiary amines may also be used as catalysts but they are less preferred. The tertiary amines used preferably have an aliphatic or cycloaliphatic structure, and mixtures of various tertiary amines may be used. Examples include compounds which are not completely water-soluble, e.g. the trialkylamines such as trimethylamine, triethylamine, tripropylamine, triisopropylamine, dimethyl-n-propylamine, tri-n-butylamine, tri-isobutyl-amine, tri-isopentylamine, dimethylbutylamine, triamylamine, trioctylhexylamine, dodecyldimethylamine, dimethylcyclohexylamine, dibutylcyclohexylamine, dicyclohexylethylamine, tetramethyl-1,3-butane-diamine; and tertiary amines containing an araliphatic group, such as dimethylbenzylamine, diethylbenzylamine and α- methylbenzyldimethylamine. Trialkylamines having a total of 6 to 15 carbon atoms in all the alkyl groups (e.g. triethyl- to triamyl-amine and dimethylcyclohexylamine) are preferred.

Suitable tertiary amines apart from the trialkylamines also include those which have an additional tertiary amino group or an ether group, in particular in the β-position to the tertiary group. Examples include dialkylaminoalkyl ethers and bis-dialkylaminoalkyl ethers (U.S. Pat. No. 3,330,782, DE-B 1,030,558), e.g. dimethyl-(2-ethoxyethyl)-amine, diethyl-(2-methoxypropyl)-amine, bis-(2dimethylaminoethyl)-ether, bis-(2-diethylaminoethyl)-ether, bis-(2-diethylaminoisopropyl)-ether, 1-ethoxy-2-dimethyl-aminoethoxyethane, N-methyl-morpholine, N-ethyl-morpholine and N-butyl-morpholine; also, permethylated polyalkylene diamines such as tetramethylethylenediamine, tetramethyl-1,2-propylenediamine, pentamethyldiethylenetriamine, hexamethyl-triethylenetriamine and higher permethylated homologs (DE-A 2,624,527 and 2,624,528); also, diethylaminoethyl-piperidine, 1,4-diaza-(2,2,2)-bicyclooctane, N,N'-dimethylpiperazine, N,N'-diethylpiperazine, N-methyl-N'-dimethylaminoethylpiperazine, N,N'-bis-dimethylaminoethylpiperazine, N,N'-bis-dimethylaminopropylpiperazine and other bis-dialkylaminoalkylpiperazines (mentioned e.g., in DE-A 2,636,787).

Preferred representatives of this group are the water-soluble compounds such as tetramethylenediamine, permethylated diethylenetriamine, N-methyl-morpholine, bis-2-dimethylaminoethylether and N-methylpiperidine.

Acylated tertiary amine derivatives such as 1-dimethylamino-3-formylaminopropane, N-(2-dimethylamonoethyl)-propionamide), N-(2-diethylaminoethyl)-benzamide and other tertiary amine containing amide groups (preferably formamide groups) according to DE-A 2,523,633 and 2,732,292 may also be used.

Tertiary amines of the pyridine series and tertiary amines containing at least one aromatic group attached to the nitrogen atom are also effective, e.g. dimethylaniline.

If the tertiary amines are not soluble in water, their boiling point should be below 250° C., preferably below 200° C.

Metal catalysts may also be used in the present invention but they are not preferred.

The polyvalent metal compounds described in the literature as catalysts for isocyanate chemistry may be used in the process according to the invention. These are preferably compounds of tin, zinc or lead, such as dibutyl tin dilaurate, tin octoate, zinc acetyl acetonate and lead octoate. These are on the whole less preferred.

The solvent component may be an aromatic, aliphatic or cycloaliphatic carboxylic acid amide which is at least partly, preferably completely water-miscible/water-soluble and has 1-10 carbon atoms in the acid moiety, e.g. dimethylformamide (DMF), formamide, diethylformamide, dimethylacetamide, dimethylpropionic acid amide, benzoic acid dimethylamide and N-methylpyrrolidone. Carboxylic acid dialkylamides are preferred, in particular dimethylformamide.

The solvent may contain up to 75 wt. % of other aprotic dipolar solvent such as: water-soluble, tetraalkylated aliphatic ureas having 4 to 12 carbon atoms, e.g. tetramethylurea or tetraethylurea; water-soluble, aliphatic or cycloaliphatic sulphones or sulphoxides having 2 to 10 carbon atoms, e.g. tetramethylsulphone or dimethylsulphoxide; and water-soluble aliphatic or cycloaliphatic phosphoric acid amides, e.g. hexamethylphosphoric acid triamide.

these optional solvents may be mixed in any proportions. Among these optional solvents, it is preferred to use those which under normal pressure boil at 56° to 250° C., preferably 64° to 165° C. because this simplifies the working up process.

Solvents which are not completely miscible with water, such as propionitrile, methyl ethyl ketone, ethyl acetate or hyrocarbons may be used in minor quantities but the addition of such solvents is not preferred. It is preferred to use DMF as the only solvent.

The following limiting conditions of the process apply to the quantities (in particular the upper limits) of solvents to be used:

1. ≧10, preferably 100 to 1000% by weight of solvent should be used per 100% by weight of isocyanate compound in the reaction mixture for hydrolysis.
2. Sufficient water and optionally solvent should be used to produce a substantially homogeneous (at the most slightly cloudy) or preferably completely homogeneous, clear solution with the isocyanate compound at the reaction temperatures. It is particularly preferred to use sufficient water to form a monophasic mixture at all temperatures of the process but always within the ratio of solvent (DMF):water and of water: NCO component mentioned above.

The catalytically active compounds are generally added to the solvents and water. They may in some cases be added to the compound containing isocyanate groups but this is not preferred.

To hydrolyze the NCO compounds to polyamines with a sufficiently high amine number (high conversion rate), it is advantageous to maintain a concentration of NCO compound of ≦75, preferably ≦55 wt % in the reaction mixture.

The degree of dilution is limited by the economics of the working up process and would in practice be in the region of a 3% solution.

However, it is necessary to use at least sufficient solvent within the above-mentioned ratios of the quantities of water, solvent and isocyanate to ensure that the reaction mixture remains substantially homogeneous, preferably completely homogeneous.

According to a less preferred embodiment of the process, compounds containing "H-active groups" and having two or more hydroxyl, amino and/or thiol groups may be added to the reaction mixture. Such compounds have already been mentioned as starting components for the isocyanate compounds used in the process according to the invention and are most preferably difunctional to optionally tetrafunctional compounds in the molecular weight range of 62 to 2000. Compounds of this type containing at least two primary hydroxyl groups, e.g. ethanediol, butanediol, propanediol, polyethylene glycols, trimethylol-propane or the like are preferred. Compounds containing different "H-active groups" may, of course, also be used, e.g. aminoalkanols.

Compounds containing only one H-active group may be used as monofunctional chain breaking agents. Methanol, ethanol, cyclohexanol, cyclohexylamine, aniline or asymmetric dimethylhydrazine are examples of such agents.

The prelengthening reaction, i.e. the reaction of isocyanate with already formed amine to undergo chain linking and form ureas, may occur as a side reaction of the process according to the invention. This side reaction can to a large extent be suppressed by carrying out the process in dilute solution, using catalysts and solvents in accordance with the invention and by maintaining relatively high reaction temperatures, e.g. 80° to 130° C. Although it is preferred to keep these side reactions down as much as possible, it may be permissible on economic grounds to accept a certain degree of prelengthening.

If the process parameters are sufficiently accurately observed, however, the method according to the invention enables the isocyanate groups to be virtually completely converted into $NH_2$ groups.

The reaction according to the invention is preferably carried out in a homogeneous phase. Slight cloudiness of the reaction mixture may temporarily occur if the starting materials are incompletely dissolved due to the presence of slightly too much water or too much isocyanate compound.

The presence of a multiphase mixture due to the addition of an excessive quantity of water and precipitation of the isocyanate prepolymer, however, results in unsatisfactory products. The optimum proportions in which the starting components should be mixed in order that homogeneous mixtures may be obtained within the required proportions may e determined by a few preliminary tests.

As already mentioned above, the reaction may be carried out at temperatures from 20° to 210° C. It is preferred, however, to employ temperatures in the range of 35° to 165° C., in particular from 80° to 130° C. because this results in the best volume/time yields combined with high solubility and, surprisingly, the least amount of urea lenghtening. In special circumstances, it may be necessary to carry out the reaction under pressure in order that sufficiently high temperatures may be obtained.

The onset of the reaction may be recognized by the almost spontaneous liberation of $CO_2$, which is observed to take place even at low temperatures, e.g. 10° C. It is however much more advantageous for the purpose of the invention to employ higher temperatures in order to suppress urea formation. It is important to ensure thorough and rapid mixing of the reactants to form a homogeneous solution. This may be achieved mainly by using solvent. The reduction in viscosity obtained when elevated reaction temperatures are employed operates in the same direction. The reaction may e carried out batchwise or continuously.

The information disclosed in DE-OS 3,223,397, page 32, line 20 to page 35, line 10 applies both to the continuous and the batchwise embodiments.

Working up of the end product may also be carried out continuously or batchwise. The reaction mixture is normally worked up by distillation, extraction or phase separation or a combination of these methods. Extraction processes, optionally after dilution with water, may be carried out with solvents which are insoluble in water, such as methylene chloride or chlorobenzene, but these methods are not preferred.

Phase separation of the reaction mixture by cooling occurs in some cases if hydrolysis has been carried out at relatively high temperatures and in the presence of a relatively large quantity of water at the limit of solubility. Phase separation may be improved or indeed achieved by the addition of water. The aqueous phase optionally containing solvent and in most cases also catalyst is separated from the polyamine phase. The aqueous phase is then in most cases ready for reuse.

The polyamine phase may contain residues of catalyst, some water and possibly solvent in addition to the polyamine. These are removed as completely as possible by distillation, if necessary with application of a vacuum or by thin layer distillation.

If the compound containing isocyanate groups still contains free (i.e. monomeric) isocyanate due to the method employed for its preparation, the monomeric amine formed from this monomeric isocyanate may in some cases accumulate in significant quantities in the water/solvent phase if the product is worked up by phase separation. The polyamine obtained by this simple method of working up is then virtually free from monomers. It may however be advisable to free the solvent phase as much as possible from monomeric amine by working it up before it is used again.

The reaction mixture is preferably worked up without phase separation by distilling off the solvent or solvent/water mixture after termination of the reaction (no more evolution of $CO_2$ observed). Distillation is preferably carried out in a vacuum (e.g. at 1 to 700 Torr) although an even higher vacuum (e.g. 0.001 to 1 Torr) may be applied for the removal of volatile residues. It has been found advantageous to start with a temperature in the region of about 60°–100° C. and subsequently to raise the temperature to 80°–100° C. The solvent which is distilled off may be used again several times.

The polyamines obtained by the process of the invention after the working up process are generally colorless to slightly colored, medium viscosity to high viscosity and in some cases relatively high melting products having an amino group content of from 0.19 to 15.23 wt. %. These polyamines may also contain groups which are already present in the starting materials from which they were produced such as urethane and/or urea and- /or uretdione and/or isocyanurate and/or biuret groups and/or uretoneimine groups and optionally ether and- /or acetal and/or carbonate and/or ester and/or thioether and/or dialkylsiloxane groups and/or the groups of polybutadienes. Additional linkages may be formed by side reactions. For example, urea groups may be formed from the already saponified portions and remaining isocyanate groups in the course of hydrolysis. The quantity of primary aromatic amino groups present in the polyamines is at the most equal to the quantity of isocyanate groups present in the isocyanate compounds, i.e. about 0.19 to 15.23 wt. % of $NH_2$ (when the isocyanate content was 0.5 to 40 wt. %), preferably 0.46 to 9.52 wt. % $NH_2$ (NCO content of 1.2 to 25 wt. %) and most preferably 0.58 to 3.81 wt. % $NH_2$ (NCO content of 1.5 to 10 wt. %).

In view of their low vapor pressure, the polyamines of the present invention, which are preferably aromatic, are advantageously used as reactants for blocked or free polyisocyanates in the production of polyurethanes (polyurethane ureas), cellular or non-cellular polyurethane plastics or polyurethane foams. These amines may also be combined with other, low molecular weight (molecular weight 32 to 399) and/or relatively high molecular weight (molecular weight 400 to about 12,000) compounds containing isocyanate reactive groups. Suitable starting components for the production of polyurethanes by known processes are mentioned above in connection with the preparation of the prepolymers as well as in DE-A 2,302,564, DE-A 2,432,764 (U.S. Pat. No. 3,903,679) and DE-A 2,639,083, 2,512,385, 2,513,815, 2,550,796, 6,330,797 2,550,833, 2,550,860 and 2,550,862. These disclosures also teach auxiliary agents and additives which may be used in the production of polyurethanes.

The present invention also relates to the use of the polyamines of the present invention for the production of polyurethane(urea)s. They may be used, for example, for the production of elastomers, coatings and threads and applied as solvent-free melts, solutions, dispersions or mixtures of reactive components.

The polyamines of the present invention may also be used as coupling components for diazo dyes, hardeners for epoxide and phenol resins and all other known reactions of amines such as the formation of amides and imides, etc.

The Examples which follow serve to illustrate the present invention. Quantities given are to be understood as parts by weight or percentages by weight unless otherwise indicated.

EXAMPLES

Example 1

The isocyanate compound used in this Example was an isocyanate prepolymer having an isocyanate content of 3.65% which has been prepared by stirring a mixture of polypropylene glycol having an Oh number of 56 and tolylene-2,4-diisocyanate is an equivalent ratio of NCO-:OH=2:1 at 80° C. for 3 hours.

A mixture of 1750 ml of dimethylformamide (DMF) and 50 ml of water (DMF/$H_2O$=33.2:1) was introduced into the reaction vessel and heated to 90° C. with stirring. 500 g of the above-described isocyanate prepolymer was added at this temperature in the course of 20 minutes. Stirring was continued for 5 minutes after all the prepolymer had been added (evolution of $CO_2$ rapidly died down) and DMF and water were then distilled off by application of a vacuum (initially 19.5 mbar and later 0.13 mbar at 80° to 100° C.) NH number ($HClO_4$): 31.1 mg KOH/g

Example 2

A mixture of 1750 ml of DMF, 50 ml of water and 1 g of sodium chloride was introduced into the reaction vessel. The experiment was then carried out with the same isocyanate prepolymer in the same amount and the product worked up as described in Example 1. The NH number ($HClO_4$) was found to be 31.3 mg KOH/g.

As Examples 1 and 2 illustrate, hydrolysis can be carried out relatively successfully with mixtures of DMF/$H_2O$ but the conversion rates are considerably lower without catalyst than with the addition of (even small quantities of )catalyst (see Example 9).

Example 3 (Comparative)

A mixture of 1750 ml of DMF, 50 ml of water and 1 g of acetic acid was introduced into the reaction vessel at 90° C. The experiment was then carried out with the same isocyanate prepolymer in the same amount and the product worked up in the same way as in Example 1, a product having an NH number ($HClO_4$) of only 28.4 mg KOH/g was obtained.

Examples 4 to 6 (Comparative)

The isocyanate compound used in these Examples was an isocyanate prepolymer which was identical to the prepolymer form Example 1 except that it had an isocyanate content of only 3.3%.

A mixture of 1.75 l of acetone or 1.75 l of dioxane or 1.75 l of acetonitrile with 25 ml of water and 0.1 g of sodium hydroxide was introduced into the reaction vessel with stirring 90° C. or at the reflux temperature of acetone, respectively acetonitrile, and using 500 g of the above-described prepolymer, the experiment was carried out and the product worked up as in Example 1.

| NH numbers ($HClO_4$) | |
|---|---|
| When acetone was used | 27.9 mg KOH/g |
| When dioxane was used | 6.85 mg KOH/g |
| when acetonitrile was used | 26.9 mg KOH/g. |

The conversion rates of NCO and $NH_2$ were unsatisfactory (i.e. low NH numbers) in spite of the use of alkaline catalysts.

Example 7 (Comparative)

A mixture of 1750 ml of methyl ether ketone, 50 g of water and 0.2 g of sodium formate was introduced into the reaction vessel at 90° C. 500 g of the isocyanate prepolymer from Example 1 were added within 20 minutes. After the reaction mixture has been worked up as in Example 1, a product having an NH number ($HClO_4$) of 31.5 mg KOH/g was obtained. The OH number was distinctly lower than that obtained when solvents according to the invention are used.

Example 8 (Comparative)

1 l of methyl ethyl ketone, 15.2 g of dimethylformamide, 30 ml of water and 1 g of sodium formate were introduced into the reaction vessel at the reflux temperature. 300 g of the isocyanate prepolymer from Example 1 were added within 20 minutes. After the reaction mixture had been worked up as in Example 1, a product having an NH number ($HClO_4$) of 23.9 mg KOH/g was obtained.

Examples 9-22

These examples demonstrate the catalytic properties of sodium hydroxide solution (NaOH).

Example 9

In this Example, a prepolymer having an isocyanate content of 3.9% prepared by stirring for 3 hours a mixture of tolylene-2,4-diisocyanate and a polyester of adipic acid, ethylene glycol and butane-1,4-diol (molar ratio ethylene glycol:butanediol=7:3) with an OH number of 56 at an NCO/OH ratio of 2:1 was used.

A mixture of 5.5 l of DMF, 125 ml of water (DMF/water ratio=41.7:1; 2.9 mol of water per isocyanate equivalent) and 0.25 g of NaOH (0.01 wt. % based on the isocyanate prepolymer) was introduced into the reaction vessel and heated to 90° C. 2.5 kg of the polyether prepolymer described above which had been heated to 70° C. were added within 45 minutes. The product was worked up as in Example 1.

| NH number (HClO$_4$) | 47.85 mg KOH/g |
|---|---|
| NH number (Ac$_2$O/Py) | 47.9 KOH/g (Py = pyridine) |
| S number (Ac$_2$O/Py) | 0.35 mg KOH/g (S number = acid number) |
| TDA content (HPLC) | 0.921% (HPLC = High Pressure Liquid Chromatography) |
| DMF residual content (GC): | 0.225% (GC = Gas Chromatography) |

Example 10

A mixture, heated to 90° C., of 1.75 l of DMF, 0.08 g of NaOH (0.016 wt. % based n the isocyanate prepolymer) and 50 ml of water (DMF/H$_2$O ratio=33.2:1; 6.375 mol of water per isocyanate equivalent) was introduced into the reaction vessel. 500 g of the isocyanate prepolymer from Example 1 having an isocyanate content of 3.65% were added within one minute. The product was worked up as in Example 1.

| NH number (HClO$_4$) | 44.8 mg KOH/g |
|---|---|
| NH number (Ac$_2$O/Py) | 46.4 mg KOH/g |
| S number (Ac$_2$O)/Py) | 0.1 mg KOH/g |

Examples 11 and 12

A mixture of 1.1 l of DMF, 0.05 g of NaOH (0.01% by weight based on the isocyanate prepolymer) and 25 g of water (DMF/water ratio 41.7:1, 3.52 mol of water per isocyanate equivalent was introduced at 90° C. into the reaction vessel. 500 g of the isocyanate prepolymer form Example 4 containing 3.3% NCO were added within 20 minutes. The product was worked up as n Example 1.

| NH number (HClO$_4$) | 47.4 mg KOH/g |
|---|---|
| NH number (Ac$_2$O/Py) | 47.6 mg KOH/g |
| S number (Ac$_2$O/Py) | 0.09 mg KOH/g |
| TDA content (HPLC) | 0.438% |

When 0.1 g of NaOH (0.02 wt. %, based on the isocyanate prepolymer) was used instead of 0.05 g of NaOH under otherwise identical conditions and using otherwise the same components, a product having an NH number (HClO$_4$) of 46.1 mg KOH/g was obtained.

EXAMPLE 13

A mixture, heated to 90° C., of 1.1 l of DMF, 0.025 g of NaOH (0.005 wt. %, based on the isocyanate prepolymer) and 25 g of water (DMF/water ratio=41.7:1) was introduced into the reaction vessel. 500 g of the isocyanate prepolymer from Example 1 having an isocyanate content of 3.6% (3.23 mol of water per isocyanate equivalent) were added within 20 minutes. The product was worked up as in Example 1.

| NH number (HClO$_4$) | 46.7 mg KOH/g |
|---|---|

Example 14

A mixture of 1.75 l of DMF, 0.01 g of NaOH (0.002 wt. %, based on the isocyanate prepolymer) and 50 g of water (DMF/water ratio=33.2:1) was introduced into the reaction vessel and heated to 90° C. 500 g of the isocyanate prepolymer from Example 1 having an isocyanate content of 3.6% (6.46 mol of water per NCO) were added within 20 minutes. The product was worked up as in Example 1.

| NH number (HClO$_4$) | 43.4 mg KOH/g |
|---|---|
| NH number (Ac$_2$O/Py) | 49.15 mg KOH/g |
| S number (Ac$_2$O/Py) | 0.1 mg KOH/g |

Example 15

A mixture of 1.1 l of DMF, 0.025 g of NaOH and 25 g of water was introduced into the reaction vessel and heated to 90° C. 500 g of the isocyanate prepolymer from Example 4 having an isocyanate content of 3.3% NCO were added within one minute and the mixture was then stirred for 20 minutes. The product was otherwise worked up as in Example 1.

| NH number (HClO$_4$) | 42.6 mg KOH/g |
|---|---|

Example 16

An isocyanate prepolymer having an isocyanate content of 3.19% and obtained from a polyester with an OH number of 50 and tolylene-2,4-diisocyanate in an NCO-/OH ratio of 2:1 was used in this Example, The polyester used was made from approximately equivalent amounts of adipic acid and hexane-1,6-diol and had an OH number of 41.

A mixture of 4.4 l of DMF, 100 g of water and 0.2 g of NaOH was introduced into the reaction vessel and heated to 90° C. with stirring. 2 kg of the above-mentioned isocyanate prepolymer (at 60° C.) were added with stirring within 45 minutes. The product was worked up as in Example 1.

| NH number (HClO$_4$) | 43.5 mg KOH/g |
|---|---|
| NH number (Ac$_2$O/Py) | 43.85 mg KOH/g |
| S number (Ac$_2$O/Py) | 0.4 mg KOH/g |
| TDA content (HPLC) | 0.81% |

Example 17

An isocyanate prepolymer having an isocyanate content of 2.34% and obtained from a polyester and tolylene-2,4-diisocyanate in an NCO/OH ratio of 2:1 was used in this Example. The polyester was made from 1:1 adipic acid and diethylene glycol and had an OH number of 41.

A mixture, heated to 90° C., of 1.75 l of DMF, 0.05 g of NaOH and 50 ml of water was introduced into the reaction vessel. 500 g of the above prepolymer were added within 30 minutes with stirring. The product was worked up as in Example 1.

| | |
|---|---|
| NH number (HClO₄) | 28.05 mg KOH/g |
| TDA content (HPLC) | 0.206% |

Example 18

An isocyanate prepolymer having an isocyanate content of 3.4% and obtained from a polyether mixture and tolylene-2,4-diisocyanate was used in this Example. The polyether mixture had an OH number of 50 and a functionality of 2.5 and was a 1:1 mixture of trimethylol propane and a PO/EO polyether which had been started on propylene glycol.

A mixture, heated to 90° C., of 3.5 l of DMF, 0.1 g of NaOH and 100 ml of water was introduced into the reaction vessel. 1000 g of the above-mentioned prepolymer were added within 40 minutes with stirring. The product was worked up as in Example 1.

| | |
|---|---|
| NH number (HClO₄) | 44.3 mg KOH/g |
| NH number (Ac₂O/Py) | 43.5 mg KOH/g |
| S number (Ac₂O/Py) | 0.3 mg KOH/g |
| TDA content (HPLC) | 0.087% |

Example 19 a prepolymer having an isocyanate content of 3.1% obtained by stirring for 3 hours at 80° C. polytetramethylene glycol having an OH number of 56 and tolylene-2,4-diisocyanate in an NCO/OH ratio of 2:1 was used in this Example.

A mixture, heated to 90° C., of 1.75 l of DMF, 0.05 g of NaOH and 50 ml of water was introduced into the reaction vessel. 500 g of the above-mentioned prepolymer were added within 20 minutes. The product was worked up as in Example 1.

| | |
|---|---|
| NH number (HClO₄) | 39.5 mg KOH/g |
| TDA content (HPLC) | 0.281% |

Example 20

A prepolymer with isocyanate content 2.8% obtained by stirring for 4 hours at 80° C. (from an ester with OH number 56 (as in Example 9) and diphenylmethane-4,4'-diisocyanate in an NCO/OH ratio of 2:1) was used in this Example.

A mixture, heated to 90° C., of 1.75 l of DMF, 0.05 g of NaOH and 50 g of water was introduced into the reaction vessel. A freshly prepared mixture of 500 g of the above-mentioned prepolymer and 200 g of DMF was added within 35 minutes. The product was worked up as in Example 1.

| | |
|---|---|
| NH number (HClO₄) | 31.4 mg KOH/g |
| NH number (Ac₂O/Py) | 29.25 mg KOH/g |
| S number (Ac₂O/Py) | 0.2 mg KOH/g |
| MDA-4,4 ' content (HPLC) | 1.48% |

Example 21

A prepolymer with isocyanate content 1.87% obtained by stirring for 4 hours at 80° C. from a polyetherdiol with an OH number of 28 (obtained by blockwise addition of 80% propylene oxide followed by 20% ethylene oxide to propylene glycol and using an NCO/OH ratio of 2:1) and 2,4-tolylene diisocyanate was used in this Example.

A mixture, heated to 90° C. of 1.75 l of DMF, 0.05 g of NaOH and 50 ml of water was introduced into the reaction vessel. 500 g of the above-described prepolymer were added in 30 minutes. The product was worked up as in Example 1.

| | |
|---|---|
| NH number (HClO₄) | 23.7 mg/KOH/g |

Example 22

An NCO:OH=2:1 prepolymer obtained by stirring for three hours at 80° C. of a polyethertriol with OH number 28 obtained by the addition of 87 wt. % propylene oxide followed by 13 wt. % ethylene oxide to trimethylolpropane and 2,4-tolylene diisocyanate having an isocyanate content of 1.8% was used in this Example A mixture of 1.75 l of DMF, 0.05 g of NaOH and 50 ml of water (12.9 mol of water per isocyanate equivalent; DMF/H₂O ratio=33.2:1) was introduced into the reaction vessel. 500 g of the isocyanate prepolymer described above were added in 30 minutes. The product was worked up as in Example 1.

| | |
|---|---|
| NH number (HClO₄) | 25.15 mg KOH/g |
| NH number (Ac₂O/Py) | 24.0 mg KOH/g |
| S number (Ac₂O/Py) | 0.2 mg KOH/g |

Examples 23-25

The efficient action of sodium aluminate is demonstrated in these Examples.

Example 23

A mixture of 1750 ml of DMF, 50 g of water and 0.1 g of sodium aluminate was introduced into the reaction vessel at 90° C. 500 g of the isocyanate prepolymer from Example 1 having an isocyanate content of 3.65% (ratio H₂O:NCO about 6.4:1) were added with stirring. The product was prepared and worked up as in Example 1.

| | |
|---|---|
| NH number (HClO₄) | 51.6 mg KOH/g |
| NH number (Ac₂O/Py) | 51.5 mg KOH/g |
| S number (Ac₂O/Py) | 0.1 mg KOH/g |
| TDA content (HPLC) | 0.81% |

Example 24

A mixture, heated to 90° C. of 1100 g of DMF, 25 g of water and 0.01 g of sodium aluminate was introduced into the reaction vessel. 500 g of the isocyanate prepolymer from Example 4 having an isocyanate content of 3.3% (ratio H₂O:NCO=approximately 3.5:1) were added within 20 minutes with stirring. The product was prepared and worked up as in Example 1.

| | |
|---|---|
| NH number (HClO₄) | 47.15 mg KOH/g |

Example 25

A mixture, heated to 90° C., of 1100 g of DMF, 25 g of water and 0.05 g of sodium aluminate was introduced into the reaction vessel. 500 g of an isocyanate prepolymer prepared by the same method as the isocyanate prepolymer from Example 1 but having an isocyanate content of 3.2% were added with stirring (ratio $H_2O$:NCO=3.65:1). The product was prepared and worked up as in Example 1.

| NH number ($HClO_4$) | 41.7 mg KOH/g |
|---|---|

Example 26

A mixture, heated to 90° C., of 1.75 l of DMF, 50 g of water and 2.5 g of $KHCO_3$ (0.5 wt. %, based on the isocyanate prepolymer; DMF/water ratio by weight=33.2:1; 7.05 mol of water per NCO) was introduced into the reaction vessel. 500 g of the isocyanate prepolymer from Example 4 having an isocyanate content of 3.3% were added within 20 minutes. The product was worked up as in Example 1.

| NH number ($HClO_4$) | 47.3 mg KOH/g |
|---|---|

Example 27-28

These Examples demonstrate that the use of larger quantities of water lead to poorer results, i.e. lower NH numbers due to lower NCO/$NH_2$ conversion rates.

Example 27

A mixture, heated to 90° C., of 1.5 l of DMF, 250 ml of water (32.32 mol of water/NCO equivalent; DMF/water ratio=5.9:1) and 0.05 g of $KHCO_3$ (0.01 wt. %, based on the prepolymer) was introduced into the reaction vessel. 500 g of the isocyanate prepolymer from Example 1 having an isocyanate content of 3.6% were added within 20 minutes. The product was worked up as in Example 1.

| NH number ($HClO_4$) | 37.8 mg KOH/g |
|---|---|
| NH number ($Ac_2O$/Py) | 38.95 mg KOH/g |
| S number ($Ac_2O$/Py) | 0.1 mg KOH/g |

Example 28

A mixture, heated to 90° C., of 1.5 l of DMF, 250 ml of water (DMF/$H_2O$ ratio=5.9:1) and 0.05 g of sodium formate was introduced into the reaction vessel. 500 g of the prepolymer from Example 4 having an isocyanate content of 3.3% were added within 20 minutes. The product was worked up as in Example 1.

| NH number ($HClO_4$) | 33.7 mg KOH/g |
|---|---|

Example 29

A mixture, heated to 90° C., of 1.75 l of DMF, 50 g of water and 0.24 g of sodium formate ($HCO_2Na$) was introduced into the reaction vessel. 500 g of the isocyanate prepolymer from Example 1 were added with stirring and the reaction was continued and the product worked up as described in Example 1.

| NH number ($HClO_4$) | 50.5 mg KOH/g |
|---|---|
| NH number ($Ac_2O$/Py) | 48.4 mg KOH/g |
| S number ($Ac_2O$/Py) | 0.1 mg KOH/g |

Examples 30 to 40

Isocyanate prepolymers obtained by stirring for 4 hours at 80° C. of a mixture of tolylene-2,4-diisocyanate and a polyoxypropylene glycol with OH numbers 32 which had been started on trimethylolpropane were used in these Examples. A product having an isocyanate content of 2.1% was used in Examples 30 to 33. A product with an isocyanate content of 2.3% was used in Examples 34 to 36, 38 and 39 and one having an isocyanate content of 2.2% was used in Examples 37 and 40.

Example 30

A mixture, heated to 90° C., of 1.1 l of DMF, 25 ml of water and 0.025 g of NaOH was introduced into the reaction vessel with stirring. 500 g of a prepolymer described above having an isocyanate content of 2.1% was added at this reaction temperature with stirring and the reaction was then continued and the product worked up as in Example 1.

| NH number ($HClO_4$) | 30.8 mg KOH/g |
|---|---|
| NH number ($Ac_2O$/Py) | 34.0 mg KOH/g |
| S number ($Ac_2O$/Py) | 0.05 mg KOH/g |

Example 31

A mixture, heated to 90° C., of 1.1 l of DMF, 25 ml of water and 0.01 g of NaOH was introduced into the reaction vessel with stirring, 500 g of the isocyanate prepolymer from Example 30 were added at this reaction temperature with stirring and then reacted and worked up as in Example 1.

| NH number ($HClO_4$) | 29.8 mg KOH/g |
|---|---|
| NH number ($Ac_2O$/Py) | 33.5 mg KOH/g |
| S number ($Ac_2O$/Py) | 0.05 mg KOH/g |

Example 32

A mixture, heated to 90° C., of 1.1 l of DMF, 25 ml of water and 0.005 g of NaOH was introduced into the reaction vessel with stirring. 500 g of the isocyanate prepolymer from Example 30 were added at this reaction temperature and reacted and worked up as in Example 1.

| NH number ($HClO_4$) | 31.1 mg KOH/g |
|---|---|
| NH number ($Ac_2O$/Py) | 32.1 mg KOH/g |
| S number ($Ac_2O$/Py) | 0.05 mg KOH/g |

Example 33

A mixture, heated to 90° C., of 1.1 l of DMF, 25 ml of water and 0.0025 g of NaOH (0.0005 wt. %, based on the prepolymer) was introduced into the reaction vessel with stirring. 500 g of the isocyanate prepolymer from Example 30 were added at this temperature with stirring and reacted and worked up as in Example 1.

| | |
|---|---|
| NH number (HClO$_4$) | 29.4 mg KOH/g |
| NH number (Ac$_2$O/Py) | 28.6 mg KOH/g |
| S number (Ac$_2$O/Py) | 0.05 mg KOH/g |

Virtually the same results were obtained when 0.0025 g of KOH was used.

Example 34

A mixture, heated to 90° C., of 1.1 l of DMF, 25 ml of water and 0.005 g of KOH was introduced into the reaction vessel with stirring. 500 g of a prepolymer similar to that used in Example 30 and described above having an isocyanate content of 2.3% were added with stirring at 90° C. and reacted and worked up as in Example 1.

| | |
|---|---|
| NH number (HClO$_4$) | 29.2 mg KOH/g |

Example 35

A mixture of 1.1 l of DMF, 25 ml of water and 0.0025 g of NaOH was introduced into the reaction vessel with stirring at 45° C., 500 g of the same isocyanate prepolymer as was used in Example 34 were added at this reaction temperature with stirring but stirring was then continued for 20 minutes (end of evolution of CO$_2$). The product was worked up as in Example 1.

Example 36

A mixture of 1.1 l of DMF, 25 ml of water and 0.1 g of NaOH was introduced into the reaction vessel at 45° C. with stirring. 500 g of the same isocyanate prepolymer as was used in Example 34 were added at this reaction temperature with stirring. Stirring was then continued for 25 minutes during which one sample was removed after 5 minutes. Both samples were worked up as in Example 1.

| | |
|---|---|
| NH number (HClO$_4$ after 5 min): | 29.4 mg KOH/g |
| NH number (HClO$_4$ after 25 min): | 29.0 mg KOH/g |

This shows that even at 45° C. the reaction was completed 5 minutes after all the reactant had been added and that more prolonged stirring did not provide any advantages.

Example 37

A mixture of 1.1 l of DMF, 25 ml of water and 0.05 g of KOH was introduced into the reaction vessel at 45° C. with stirring. 500 g of an isocyanate prepolymer similar to that described in Example 30 above but having an isocyanate content of 2.2% were added at this temperature with stirring. Subsequent treatment of the reaction mixture and working up were the same as in Example 1.

| | |
|---|---|
| NH number (HClO$_4$) | 29.0 mg KOH/g |

Example 38

A mixture of 1.1 l of DMF and 25 ml of water was introduced into the reaction vessel at 90° C. with stirring. 500 g of the isocyanate prepolymer from Example 34 were added at this reaction temperature with stirring. The product was worked up as in Example 1.

| | |
|---|---|
| NH number (HClO$_4$) | 17.5 mg KOH/g |

When 0.2 g of 1/10N NaOH were added to this reaction mixture after all the isocyanate prepolymer had been added and the mixture was then stirred at 90° C. for 45 minutes, the product obtained after the reaction mixture was worked up as in Example 1 and had an NH number of 17.8 mg KOH/g (HClO$_4$ method). This showed that even without a catalyst, the reaction was completed within 5 minutes after all of the isocyanate prepolymer had been added.

Example 39

A mixture of 1.1 l of DMF and 25 ml of water was introduced into the reaction vessel with stirring at a reaction temperature of 137° C. (reflux). 500 g of the isocyanate prepolymer from Example 34 were added within 27 minutes. The reaction temperature fell to 130° C. (bath temperature 160°–180° C.) on addition of the isocyanate prepolymer and reflux died down.

When the reaction mixture was worked up after a further 5 minutes of stirring under reflux, a product having an NH number (HClO$_4$) of 20.7 mg KOH/g was obtained.

When the reaction mixture was worked up under reflux after 30 minutes of stirring, a product having an NH number (HClO$_4$) of 21.3 mg KOH/g was obtained.

This shows that even without catalyst and at this temperature the reaction was completed within 5 minutes after all the isocyanate prepolymer had been added.

Examples 38 and 39 also demonstrate that although the product obtained without the aid of a catalyst is superior to one prepared according to DE 3,223,398 without a catalyst, it had a high degree of prelengthening (urea formation).

Example 40 (Comparison Examples to Example 38)

A mixture of 1.1 of DMF and 300 ml of water was introduced into the reaction vessel and heated to 90° C. with stirring. 500 g of the isocyanate prepolymer from Example 37 were added within 20 minutes with stirring. A gel-like polymer then separated which would not dissolve even in pure DMF or in acetic acid. When attempts were made to determine an NH number of the insoluble material, the result obtained was <2 mg of KOH/g as the NH number.

This experiment demonstrates that the water/solvent (or water/DMF) ratios used in DE 3,223,398 and 3,233,397 give less favorable results than those obtained in the process of the present invention. This means that the product obtained by the prior art process is virtually unusable whereas the process according to the invention provides useful liquid and soluble products with respectable NCO/NH$_2$ conversion rates and considerable NH numbers even when carried out in a manner which is not preferred.

Example 41

616 ml of DMF and 14 ml of H$_2$O were introduced into a 1.3 l autoclave and heated to 150° C. 280 g of the isocyanate prepolymer used in Example 37 were then added with stirring within 5 minutes, using a dosing pump. The temperature of the isocyanate prepolymer was 50° C. Stirring was then continued for a further 5 minutes at 150° C. and the reaction mixture was cooled, the pressure released and the solvent distilled off as in Example 1. A brown material having the following data was obtained:
NH number (HClO$_4$): 28.9 mg KOH/g
NH number (Ac$_2$O/Py): 27.1 mg KOH/g
S number: 0.05 mg KOH/g
Molar masses: 3825, theoretical 3851 (determined by vapor pressure osmometry)
TDA content: 0.288 wt. %

Example 42 (Comparative)

600 ml of water were heated to 150° C. in a 1.3 l autoclave, and 300 g of the isocyanate prepolymer from Example 37 heated to 50° C. were added within 10 minutes. Stirring was continued for a further 5 minutes at 150° C. and the reaction mixture was then cooled, the pressure released and the water decanted from the product obtained. The product was a viscous rubber but was still partly soluble in a DMF/ethanol mixture at 80° C.

The NH number of the part that was still soluble (after removal of the solvent by distillation) was 11.1 mg KOH/g (HClO$_4$).

Example 43 (Comparative)

Example 42 was repeated with the exception that 0.06 g of KOH were added to the water. The product obtained after working up was a swelled material completely insoluble in DMF. No NH number could be determined.

Example 44 a) Preparation of Prepolymer 1218 g of toluylene diisocyanate (7 mol) were heated to 60° C. 90 g of butane-1,4-diol were added within 40 minutes. The reaction product precipitated towards the end of the reaction. Stirring was then continued for one hour at 60° C. The pasty mixture was diluted with 2 l of cyclohexane at 23° C. and suction filtered, washed with cyclohexane and petroleum ether and dried in a vacuum drying cupboard at 40° C. The product melted at 130° to 131° C. and had an isocyanate content 19.0% (the calculated isocyanate content for a 2:1 adduct is 19.2%).

b) Preparation of Polyamine

A mixture of 3256 ml of DMF, 0.15 g of KOH and 74 ml of water was introduced into the reaction vessel. A suspension of 310 g of the above-mentioned isocyanate prepolymer in 600 ml of DMF was added with stirring at 90° C. within 20 minutes. 31 l of CO$_2$ were found to evolve (theoretical 31.4 l). The solvent was then to a large extent distilled off and the product was precipitated from the liquid residue by means of a 10:1 mixture of water and methanol. The product was suction filtered, washed with water and dried.
NH number (Ac$_2$O/Py): 274 mg KOH/g (Th.: 288)
Acid number (Ac$_2$O/Py): 0.4 mg KOH/g
Molar mass (vapor pressure osmometry): 395-400 (Th.:378)
TDA value (HPLC): 0.352%
NH number (HClO$_4$): 264 mg KOH/g; m.pt.: 168°-169° C.

Example 45

A mixture of 1750 ml of dimethylformamide, 30 ml of water and 0.01 g of potassium octoate (0.002 wt. % based on the isocyanate prepolymer) was introduced into the reaction vessel. The mixture was heated to 90° C. 500 g of the isocyanate prepolymer from Example 9 heated to 70° C., were added within 20 minutes and worked up as described in that Example. The polyamine had an NH number (Ac$_2$O/Py) of 47.95 mg KOH/g.

What is claimed is:

1. A one-step process for the production of polyamines containing primary amino groups in which
    (a) an organic isocyanate having an isocyanate content of from 0.5 to 40 wt. % is hydrolyzed with
    (b) from 1.25 to 12 mols of water for each equivalent of isocyanate groups in (a) in the presence of
    (c) at least 10% by weight of a water-soluble carboxylic acid amide based on 100% by weight of (a) and
    (d) a not-incorporable catalyst consisting of 0.0001 to 0.099% by weight, based on 100 % by weight of (a), or an alkali metal hydroxide;
in which the weight ratio of (c) to (b) is from 10 to 150, a homogeneous phase is maintained during hydrolysis, and the hydrolysis is carried out at a temperature of from 20° to 210° C.

2. A process according to claim 1 wherein the alkali metal hydroxide is potassium hydroxide.

3. A process according to claim 1 in which the weight ratio of (c) to (b) is from 25 to 75.

4. A process according to claim 1 in which the hydrolysis is carried out at a temperature of from 35° to 165° C.

5. A process according to claim 1 in which the water-soluble carboxylic acid amide (c) is dimethylformamide or dimethylacetamide.

6. A process according to claim 1 in which the water-soluble carboxylic acid amide (c) is dimethylformamide and from 1.5 to 7.5 mols of water are used for each equivalent of isocyanate groups in (a).

7. A process according to claim 6 in which the hydrolysis is carried out at a temperature of from 35° to 165° C.

8. A process according to claim 1 in which the isocyanate (a) contains aromatically bound isocyanate groups and is an NCO-prepolymer or modified polyisocyanate.

9. A process according to claim 1 in which the isocyanate (a) has an isocyanate content of from 1.2 to 25 wt. %.

10. A process according to claim 9 in which the isocyanate (a) is an isocyanate prepolymer having an isocyanate content of from 1.5 to 10 wt. % or a modified polyisocyanate having an isocyanate content of from 1.5 to 20.5 wt. %.

11. A process according to claim 1 in which (e) from 0.1 to 5% by weight of a compound containing at least one hydroxyl, amino, or thiol group, or a combination thereof, for every 100% by weight of (a) is present during the hydrolysis.

* * * * *

UNITED STATES PATENT AND TRADEMARK OFFICE
CERTIFICATE OF CORRECTION

PATENT NO. : 5,283,364

DATED : February 1, 1994

INVENTOR(S) : Werner Rasshofer et al

It is certified that error appears in the above-identified patent and that said Letters Patent is hereby corrected as shown below:

At column 1, line 46, delete "attached" and insert --attacked--.

At column 1, line 59, delete "for preparation" and insert --for the preparation--.

At column 2, line 7, delete "relates to the preparations" and insert --relates to the preparation--.

At column 2, line 26, delete "DE-P 1,115,907" and insert --DE-P 1,155,907--.

At column 2, line 29, delete "De-B 1,215,373" and insert --DE-B 1,215,373--.

At column 2, line 36, delete "acylonitrile" and insert --acrylonitrile--.

At column 3, line 7, delete "3323" and insert --332--.

At column 3, line 31, delete "DE-OS 3,233,398" and insert --DE-OS 3,223,398--.

At column 3, line 32, delete "DE-OS 3,233,397" and insert --DE-OS 3,223,397--.

At column 3, line 42, delete "DE-OS 3,233,398" and insert --DE-OS 3,223,398--.

At column 3, line 45, delete "DE-OS 3,233,397" and insert --DE-OS 3,223,397--.

At column 4, line 34, delete "1/2 of water" and insert --1/2 mol of water--.

UNITED STATES PATENT AND TRADEMARK OFFICE
CERTIFICATE OF CORRECTION

PATENT NO. : 5,283,364
DATED : February 1, 1994
INVENTOR(S) : Werner Rasshofer et al It is certified that error appears in the above-indentified patent and that said Letters Patent is hereby corrected as shown below:

At column 4, line 56, delete "since the catalysts" and insert --Since the catalysts--.

At column 5, line 28, delete "from about 80° to 100°C" and insert --from above 80° to 100°C--.

At column 5, line 35, delete "preferably" and insert --preferable--.

At column 6, line 2, after "preferably 5 to 150" and before "more preferably 10 to 100", insert --,--.

At column 6, line 12, delete "0.002 to 0.80%" and insert --0.002 to 0.08%--.

At column 6, line 18, delete "metal salts if" and insert --metal salts of--.

At column 6, line 46, delete "0.99% by weight" and insert --0.099% by weight--.

At column 8, line 8, delete "(excess) quantities or aromatic" and insert --(excess) quantities of aromatic--.

Column 8, line 15, delete "polyols)1 polyisocyanates and insert --polyols); polyisocyanates--.

At column 11, line 2, delete "acetonacetates" and insert --acetoacetates--.

At column 11, line 28, delete "bis-(2dimethylaminoethyl)-ether" and insert --bis-(2-dimethylaminoethyl)-ether--.

At column 11, line 52, delete "tertiary amine containing" and insert --tertiary amines containing--.

UNITED STATES PATENT AND TRADEMARK OFFICE
CERTIFICATE OF CORRECTION

PATENT NO. : 5,283,364
DATED : February 1, 1994
INVENTOR(S) : Werner Rasshofer et al It is certified that error appears in the above-indentified patent and that said Letters Patent is hereby corrected as shown below:

At column 12, line 13, delete "dipolar solvent such as:" and insert --dipolar solvents such as:--.

At column 12, line 21, delete "these" and insert --These--.

At column 13, line 44, delete "may e determined" and insert --may be determined--.

At column 13, line 65, delete "mainly by using solvent" and insert --mainly by using solvents--.

At column 13, line 68, delete "may e carried out batchwise" and insert --may be carried out batchwise--.

At column 14, line 54, delete "groups which are" and insert --groups which were--.

At column 15, line 20, delete "6,330,797" and insert --2,550,797--.

At column 16, line 17, delete "prepolymer form Example 1" and insert --prepolymer from Example 1--.

At column 16, line 22, delete "stirring 90°C" and insert --stirring at 90°C--.

At column 16, line 34, delete "NCO and $NH_2$" and insert --NCO into $NH_2$--.

At column 16, line 43, delete "mixture has been worked up" and insert --mixture had been worked up--.

UNITED STATES PATENT AND TRADEMARK OFFICE
CERTIFICATE OF CORRECTION

PATENT NO.   : 5,283,364
DATED        : February 1, 1994
INVENTOR(S)  : Werner Rasshofer et al It is certified that error appears in the above-indentified patent and that said Letters Patent is hereby corrected as shown below:

At column 17, line 24, delete "% based n the isocyanate" and insert --% based on the isocyanate--.

At column 17, line 44, delete "form Example 4" and insert --from Example 4--.

At column 17, line 45, delete "worked up as n" and insert --worked up as in--.

At column 19, line 28, delete "a prepolymer" and insert --A prepolymer--.

At column 22, line 13, delete "OH numbers 32" and insert --OH number 32--.

At column 24, line 55, delete "3,233,397" and insert --3,223,397--.

IN THE CLAIMS:

In Claim 1, at column 26, line 26, delete "(a), or an alkali metal hydroxide" and insert --(a), of an alkali metal hydroxide--.

Signed and Sealed this

Sixth Day of September, 1994

Attest:

BRUCE LEHMAN

Attesting Officer

Commissioner of Patents and Trademarks